US005563793A

United States Patent [19]
Nakaura

[11] Patent Number: 5,563,793
[45] Date of Patent: Oct. 8, 1996

[54] WHEEL SPEED DETECTING APPARATUS

[75] Inventor: Tohru Nakaura, Itami, Japan

[73] Assignee: Sumitomo Electric Industries, Ltd., Osaka, Japan

[21] Appl. No.: 327,597

[22] Filed: Oct. 24, 1994

[30] Foreign Application Priority Data

Nov. 5, 1993 [JP] Japan .................................. 5-276744

[51] Int. Cl.$^6$ .................................. B60T 8/26; G01P 3/56
[52] U.S. Cl. .................... 364/426.04; 303/121; 303/173; 180/197
[58] Field of Search .......................... 364/426.02, 426.03, 364/426.04, 565; 303/94, 95, 100, 102, 103, 106, 121, 122.05, 132, 173, 186; 324/160, 161, 166; 180/197

[56] References Cited

U.S. PATENT DOCUMENTS

| | | | |
|---|---|---|---|
| 4,511,014 | 4/1985 | Makita | 180/233 |
| 4,552,241 | 11/1985 | Suzuki | 180/197 |
| 4,874,059 | 10/1989 | Kasegawa | 364/424.1 |
| 4,943,922 | 7/1990 | Tanaka | 364/426.02 |
| 4,986,388 | 1/1991 | Matsuda | 364/424.1 |
| 5,015,042 | 5/1991 | Yoshino | 303/96 |
| 5,016,179 | 5/1991 | Utzt | 364/426.02 |
| 5,060,747 | 10/1991 | Eto | 180/197 |
| 5,079,709 | 1/1992 | Hirako et al. | 364/426.02 |
| 5,179,526 | 1/1993 | Zimmer et al. | 364/565 |
| 5,200,897 | 4/1993 | Makino et al. | 364/426.02 |
| 5,210,692 | 5/1993 | Fennel et al. | 364/426.02 |
| 5,213,177 | 5/1993 | May | 364/426.03 |
| 5,370,199 | 12/1994 | Akuta et al. | 180/197 |

FOREIGN PATENT DOCUMENTS

| | | |
|---|---|---|
| 0374924 | 6/1990 | European Pat. Off. . |
| 0463305 | 1/1992 | European Pat. Off. . |
| 2647074 | 11/1990 | France . |
| 4016903 | 11/1990 | Germany . |
| 4230295 | 3/1994 | Germany . |
| 5-16774 | 1/1993 | Japan . |

OTHER PUBLICATIONS

European Search Report and Annex.

*Primary Examiner*—Kevin J. Teska
*Assistant Examiner*—Tan Q. Nguyen
*Attorney, Agent, or Firm*—Greenblum & Bernstein P.L.C.

[57] ABSTRACT

An apparatus for detecting wheel speed in a motor vehicle. The apparatus includes first, second, and third sensors for outputting pulse signals in response to rotations of rotary shafts of front left and right wheels and a drive shaft, respectively, and a rotational angular velocity calculating member for calculating first, second, and third rotational angular velocities of the first and second rotary shafts and the drive shaft from the pulse signals, respectively. The apparatus also provides a front wheel speed calculating member for calculating first and second wheel speeds of the front left and right wheels from the first and second rotational angular velocities, an average front wheel speed calculating member for calculating an average front wheel speed from the first and second wheel speeds, a factor correcting member for correcting a conversion factor including a change gear ratio of a transmission mechanism and a wheel radius, and an average rear wheel speed calculating member for calculating an average rear wheel speed from the third rotational angular velocity and the conversion factor.

12 Claims, 8 Drawing Sheets

WHEEL SPEED DETECTING APPARATUS

BACKGROUND OF THE INVENTION

The present invention generally relates to a wheel speed detecting apparatus and more particularly, to a wheel speed detecting apparatus suitable for an antiskid control device, which is capable of detecting wheel speed accurately even when setting of change gear ratio of a transmission mechanism or wheel radius has been changed.

Generally, in an antiskid brake system for a motor vehicle, skid symptom is detected by comparing wheel speed and vehicle body speed with each other. Thus, various wheel speed detecting apparatuses used for the antiskid brake system have been so far provided. Usually, the wheel speed detecting apparatuses of this kind are constituted by wheel speed sensors and a controller. Each of the wheel speed sensors is fixed to a rotary shaft coupled with wheels and includes a geared rotor rotatable with the rotary shaft and a pickup sensor for detecting each of teeth of the rotating rotor and outputting pulse signals, which is provided so as to confront the rotor. The controller calculates wheel speed from the pulse signals inputted from the wheel speed sensors.

Figure 1:
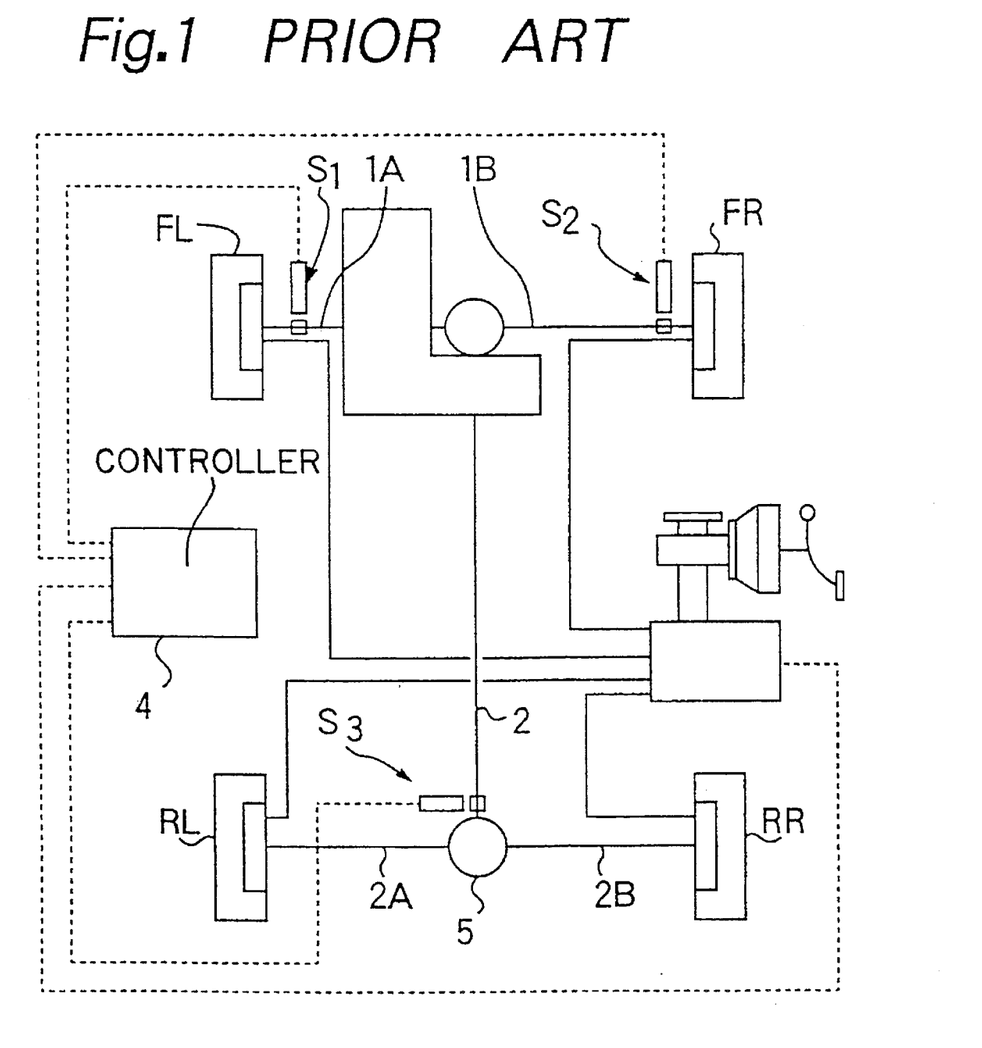
FIG. 1 is a schematic view showing one example of a prior art antiskid brake system provided with a wheel speed detecting apparatus (already referred to)

An antiskid brake system for a four-wheel motor vehicle of rear wheel drive shown in FIG. 1 includes first and second wheel speed sensors $S_1$ and $S_2$ for outputting pulse signals in response to rotation of a rotary shaft 1A for a front left wheel FL and a rotary shaft 1B for a front right wheel FR, respectively and a third wheel speed sensor $S_3$ for outputting pulse signals in response to rotation of a propeller (drive or propulsion) shaft 2. A controller 4 calculates rotational angular velocities $SA_1$ and $SA_2$ of the rotary shafts 1A and 1B for the front left and right wheels FL and FR from the pulse signals of the first and second wheel speed sensors $S_1$ and $S_2$ and further calculates wheel speeds $SW_1$ and $SW_2$ of the front left and right wheels FL and FR from the rotational angular velocities $SA_1$ and $SA_2$ and radius of the front left and right wheels FL and FR (wheel radius).

Meanwhile, the controller 4 calculates a rotational angular velocity $SA_3$ of the propeller shaft 2 from the pulse signals of the third wheel speed sensor $S_3$ and further calculates an average wheel speed of rear left and right wheels RL and RR (average rear wheel speed) from the rotational angular velocity $SA_3$ and a conversion factor indicative of change gear ratio of a differential gear 5 and wheel radius.

However, change gear ratio of the differential gear 5 varies according to models of motor vehicles, etc. and thus, the conversion factor is required to be changed accordingly. Meanwhile, also when wheel radius changes upon replacement of wheels, etc., the conversion factor should be changed accordingly. Therefore, in case change gear ratio of the differential gear 5 or wheel radius changes, the controller 4 should be replaced by another one.

In order to eliminate such a drawback of the known wheel speed detecting apparatus, Japanese Patent Laid-Open Publication No. 5-16774 (1993) proposes a wheel speed detecting apparatus in which a selector switch is provided in a controller such that the conversion factor can be set selectively in accordance with change gear ratio and wheel radius. However, in this prior art wheel speed detecting apparatus, since the selector switch is required to be provided in the controller, production cost of the controller rises accordingly. Meanwhile, if the selector switch malfunctions, wheel speed is not calculated properly in accordance with each change gear ratio, thereby resulting in deterioration of control performance of the antiskid brake system. Furthermore, when an operator inadvertently fails to change setting of the conversion factor by using the selector switch in spite of the fact that change gear ratio of the differential gear or wheel radius has been changed, the wheel speed detecting apparatus cannot be controlled correctly.

SUMMARY OF THE INVENTION

Accordingly, an essential object of the present invention is to provide, with a view to eliminating the inconveniences inherent in conventional wheel speed detecting apparatuses, a wheel speed detecting apparatus which reduces production cost of a controller and prevents deterioration of control performance of an antiskid brake system due to malfunctions of a selector switch and in which when setting of change gear ratio or wheel radius has been changed, a proper conversion factor is set automatically such that a correct wheel speed can be calculated.

In order to accomplish this object of the present invention, a wheel speed detecting apparatus for detecting wheel speed of a motor vehicle in which a propeller shaft coupled with a driving source is connected with rotary shafts of rear left and right wheels through a transmission mechanism, according to the present invention comprises: first, second and third sensor means for outputting pulse signals in response to rotations of rotary shafts of front left and right wheels and the propeller shaft, respectively; a rotational angular velocity calculating means for calculating first, second and third rotational angular velocities of the rotary shafts of the front left and right wheels and the propeller shaft from the pulse signals of the first, second and third sensor means, respectively; a front wheel speed calculating means for calculating first and second wheel speeds of the front left and right wheels from the first and second rotational angular velocities, respectively; an average front wheel speed calculating means for calculating an average front wheel speed of the front left and right wheels from the first and second wheel speeds; a factor correcting means for correcting a conversion factor including a change gear ratio of the transmission mechanism and a wheel radius; and an average rear wheel speed calculating means for calculating an average rear wheel speed of the rear left and right wheels from the third rotational angular velocity and the conversion factor.

More specifically, the factor correcting means compares the average front wheel speed and the average rear wheel speed with each other and corrects the conversion factor by increasing or reducing the conversion factor through addition or subtraction until an absolute value of a difference between the average front wheel speed and the average rear wheel speed reaches not more than a predetermined value.

Alternatively, when one of a plurality of prospective conversion factor values gives a minimum of absolute values of differences between the prospective conversion factor values and a ratio of the third rotational angular velocity to the average front wheel speed and a state that the minimum falls within a predetermined range lasts for a predetermined period, the factor correcting means corrects the conversion factor by setting the one of the prospective conversion factor values to the conversion factor.

It is preferable that the conversion factor is not corrected during antiskid control of the motor vehicle.

Meanwhile, it is also preferable that the conversion factor is not corrected during detection of spinning of the wheels.

Furthermore, it is preferable that conversion factor is not corrected during braking of the motor vehicle.

Meanwhile, in case the wheel speed detecting apparatus of the present invention is used for an antiskid brake system, it is preferable that antiskid control is performed by using a reference vehicle body speed calculated as follows. Namely, before correction of the conversion factor is completed, the reference vehicle body speed is calculated from the first and second wheel speeds of the front left and right wheels. On the other hand, after correction of the conversion factor has been completed, the reference vehicle body speed is calculated from the first and second wheel speeds and the average rear wheel speed.

In addition, when the wheel speed detecting apparatus of the present invention is used for an antiskid brake system, antiskid control may be performed as follows. Namely, before correction of the conversion factor is completed, antiskid control is not performed. On the contrary, after correction of the conversion factor has been completed, the reference vehicle body speed is calculated from the first and second wheel speeds and the average rear wheel speed and antiskid control is performed by using this reference vehicle body speed.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
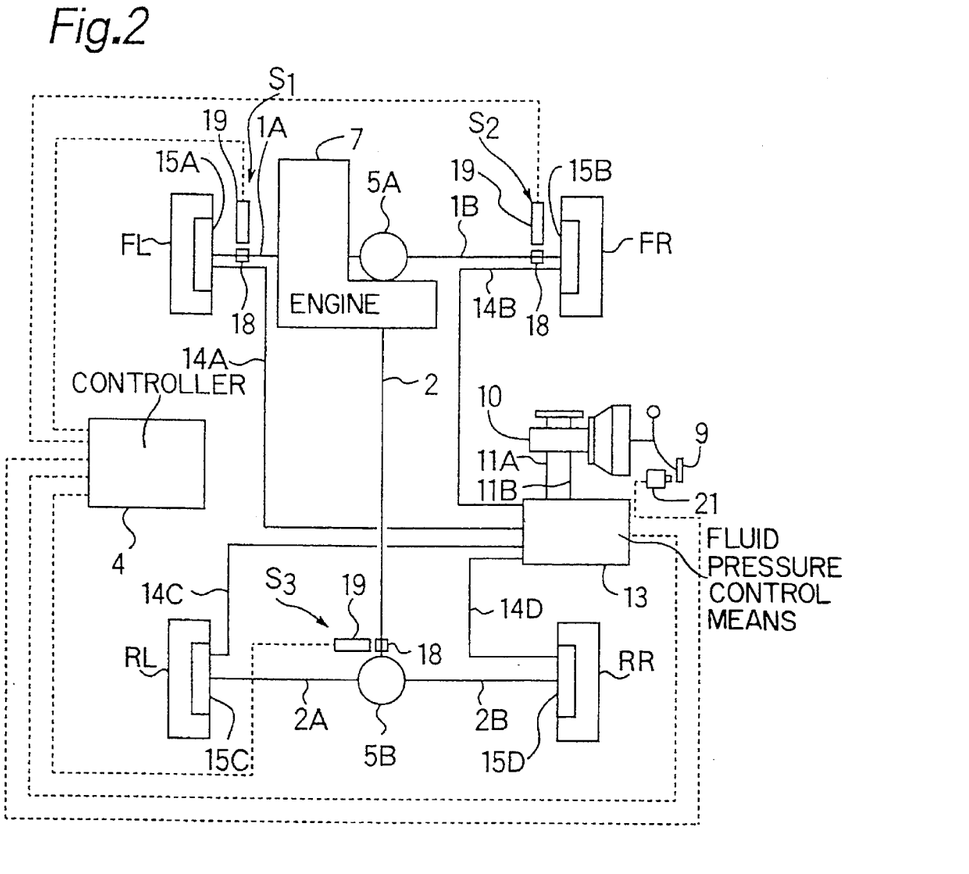
FIG. 2 is a schematic view of an antiskid brake system provided with a wheel speed detecting apparatus according to a first embodiment of the present invention.
Figure 3:
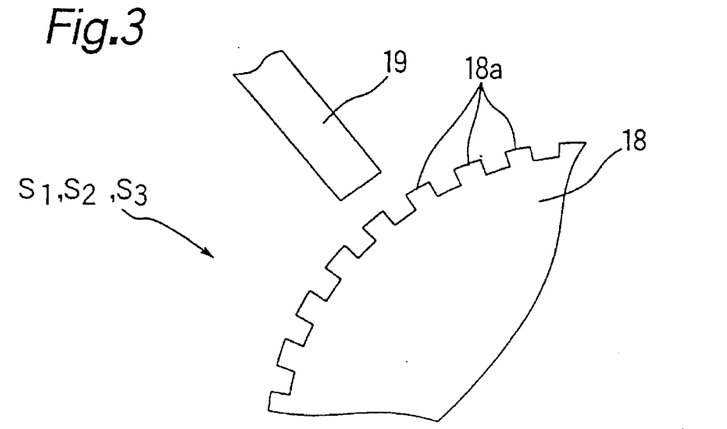
FIG. 3 is a fragmentary schematic view of a wheel speed sensor employed in the wheel speed detecting apparatus of FIG. 2.
Figure 4:
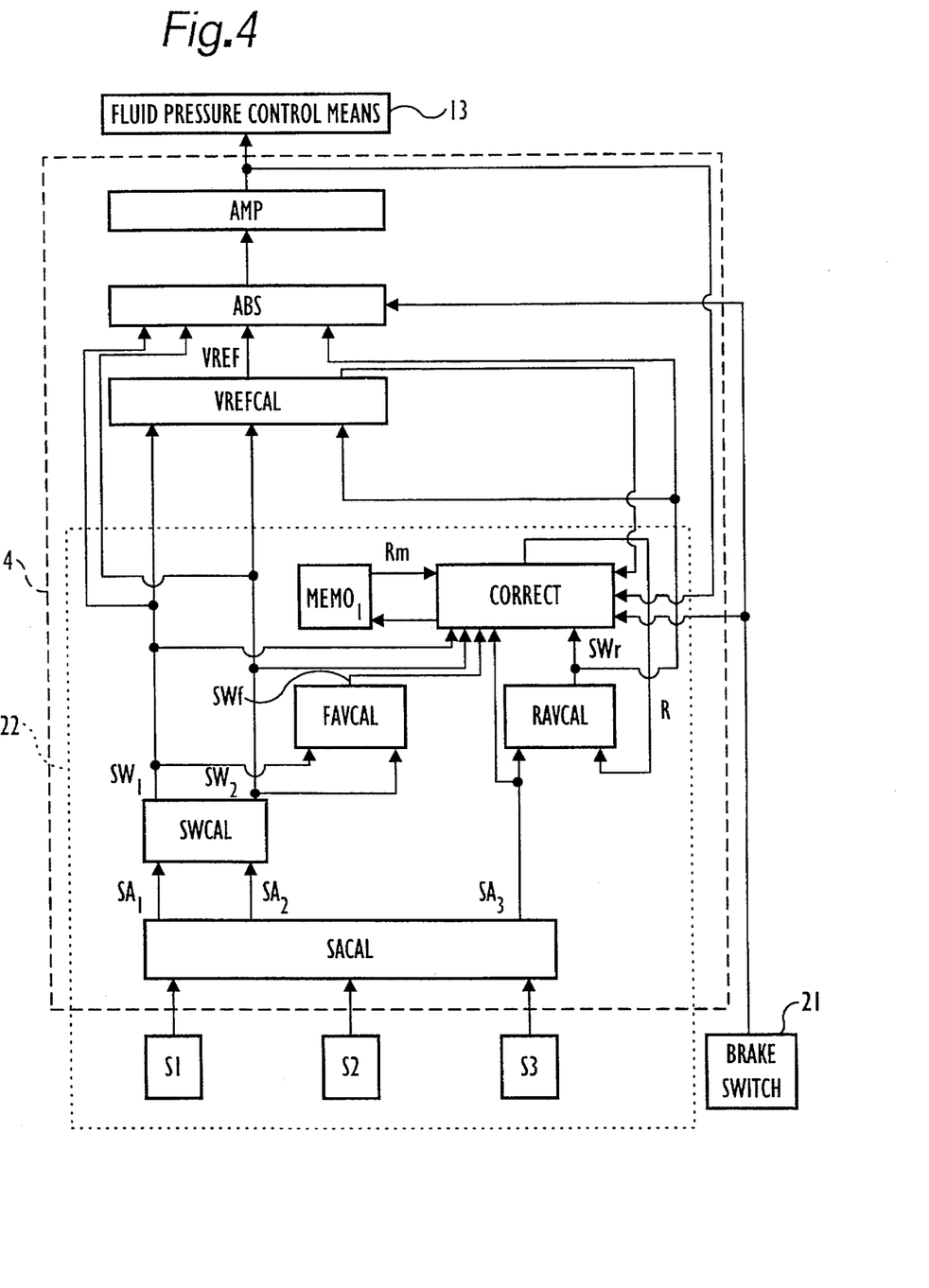
FIG. 4 is a block diagram of the wheel speed detecting apparatus of FIG. 2.

Referring now to the drawings, there is shown in FIGS. 2 to 4, an antiskid brake system provided with a wheel speed detecting apparatus 22 according to a first embodiment of the present invention. This antiskid brake system is used for controlling braking of a four-wheel motor vehicle of rear wheel drive. Rotary shafts 1A and 1B of front left and right driven wheels FL and FR are coupled with each other through a differential gear 5A for front wheels. A propeller (drive or propulsion) shaft 2 is coupled with an engine 7 through a clutch (not shown) and a transmission (not shown). Rotary shafts 2A and 2B of rear left and right driving wheels RL and RR are coupled with the propeller shaft 2 via a differential gear 5B for rear wheels.

Conduits 11A and 11B are connected with a master cylinder 10 which is actuated by a brake pedal 9 and are also connected with conduits 14A, 14B, 14C and 14D for wheel cylinders 15A, 15B, 15C and 15D through a fluid pressure controlling means 13, respectively. More specifically, the conduit 14A leading to the wheel cylinder 15A for the front left wheel FL and the conduit 14D leading to the wheel cylinder 15D for the rear right wheel RR are connected with the conduit 11A through the fluid pressure controlling means 13. On the other hand, the conduit 14B leading to the wheel cylinder 15B for the front right wheel FR and the conduit 14C leading to the wheel cylinder 15C for the rear left wheel RL are connected with the conduit 11B through the fluid pressure controlling means 13. The fluid pressure controlling means 13 is of known type in which liquid pressure of the wheel brakes 15A–15D is increased, reduced and maintained in response to control signals from a controller 4. First, second and third wheel speed sensors $S_1$, $S_2$ and $S_3$ are, respectively, provided at the rotary shaft 1A for the front left wheel FL, the rotary shaft 1B for the front right wheel FR and the propeller shaft 2. In FIG. 2, reference numeral 21 denotes a brake switch. When a driver kicks the brake pedal 9, the brake switch 21 is turned on so as to transmit to the controller 4 a signal indicating that the brake pedal 9 is kicked (brake pedal "ON" state).

As shown in FIG. 3, the first, second and third wheel speed sensors $S_1$, $S_2$ and $S_3$ are secured to the rotary shafts 1A and 1B and the propeller shaft 2, respectively and each include a geared rotor 18 having a plurality of teeth 18a formed on its outer periphery at a predetermined interval and a pickup sensor 19 confronting the rotor 18. A permanent magnet and a coil are provided in the pickup sensor 19. When the rotor 18 is rotated together with the rotary shafts 1A and 1B or the propeller shaft 2, distance between the outer periphery of the rotor 18 and the pickup sensor 19 changes. As a result, since magnetic flux formed by the above mentioned permanent magnet changes, alternating current is generated in the coil. Consequently, each time the teeth 18a of the rotor 18 passes by the pickup sensor 19, the first, second and third wheel speed sensors $S_1$, $S_2$ and $S_3$ output pulse signals.

As shown in FIG. 4, the controller 4 includes a rotational angular velocity calculating means SACAL, a front wheel speed calculating means SWCAL, an average front wheel speed calculating means FAVCAL, an average rear wheel speed calculating means RAVCAL, a factor correcting means CORRECT and a first storage means $MEMO_1$, which form a portion of the wheel speed detecting apparatus 22. The controller 4 further includes a reference vehicle body speed calculating means VREFCAL, an antiskid control decision means ABS and a signal amplifier means AMP. The rotational angular velocity calculating means SACAL calculates rotational angular velocities $SA_1$ and $SA_2$ of the rotary shafts 1A and 1B on the basis of the pulse signals inputted from the first and second wheel speed sensors $S_1$ and $S_2$ and outputs the rotational angular velocities $SA_1$ and $SA_2$ to the front wheel speed calculating means SWCAL. Meanwhile, the rotational angular velocity calculating means SACAL calculates a rotational angular velocity $SA_3$ of the propeller shaft 2 on the basis of the pulse signals inputted from the third wheel speed sensor $S_3$ and outputs the rotational angular velocity $SA_3$ to the average rear wheel speed calculating means RAVCAL.

Assuming that Z denotes a total number of the teeth 18a of the rotor 18 and N denotes the number of the pulse signals outputted (the number of the teeth 18a detected) during a period T, the rotational angular velocities $SA_1$, $SA_2$ and $SA_3$ of the rotary shafts 1A and 1B and the propeller shaft 2 are expressed by the following equation (1).

$$SA_1, SA_2, SA_3 = (2\pi \times N)/(T \times Z) \qquad (1)$$

The front wheel speed calculating means SWCAL calculates wheel speeds $SW_1$ and $SW_2$ of the front left and right wheels FL and FR from the rotational angular velocities $SA_1$ and $SA_2$ of the rotary shafts 1A and 1B inputted from the rotational angular velocity calculating means SACAL.

Supposing that A denotes a wheel radius, the wheel speeds $SW_1$ and $SW_2$ are given by the following equation (2).

$$SW_1, SW_2 = (2\pi \times N \times A)/(T \times Z) \qquad (2)$$

Meanwhile, the front wheel speed calculating means SWCAL outputs the calculated wheel speeds $SW_1$ and $SW_2$ to the average front wheel speed calculating means FAVCAL, the reference vehicle body speed calculating means VREFCAL and the antiskid control decision means ABS. The average front wheel speed calculating means FAVCAL calculates an average of the wheel speeds $SW_1$ and $SW_2$ of the front left and right wheels FL and FR calculated by the front wheel speed calculating means SWCAL, i.e. an average front wheel speed SWf from the following equation (3).

$$SWf = (SW_1 + SW_2)/2 \qquad (3)$$

The average rear wheel speed calculating means RAVCAL calculates an average of wheel speeds of the rear left and right wheels RL and RR, i.e. an average rear wheel speed SWr from the rotational angular velocity $SA_3$ of the propeller shaft 2 and a conversion factor R corrected by the factor correcting means CORRECT to be described later.

When a change gear ratio (reduction gear ratio) η of the differential gear 5B is defined by the following equation (4) and SAr denotes an average rotational angular velocity of the rotary shafts 2A and 2B of the rear left and right wheels RL and RR, the average rear wheel speed SWr is given by the following equation (5).

$$\eta = SA_3/SAr \qquad (4)$$

$$SWr = (A/\eta) \times SA_3 \qquad (5)$$

In the first embodiment, the conversion factor R is employed as (A/η) in the equation (5), i.e. a factor indicative of change gear ratio of the differential gear 5 and the wheel radius A. Namely, in the first embodiment, by using the conversion factor R defined by the following equation (6), the average rear wheel speed SWr is calculated by the following equation (7).

$$R = \eta/A \qquad (6)$$

$$SWr = SA_3 R \qquad (7)$$

Furthermore, the average rear wheel speed calculating means RAVCAL outputs the calculated average rear wheel speed SWr to the factor correcting means CORRECT, the reference vehicle body speed calculating means VREFCAL and the antiskid control decision means ABS. The factor correcting means CORRECT corrects the conversion factor R on the basis of the average front wheel speed SWf and the average rear wheel speed SWr and outputs the corrected conversion factor R to the average rear wheel speed calculating means RAVCAL. In the first embodiment, when absolute value of difference between the average front wheel speed SWf and the average rear wheel speed SWr is more than a predetermined value by comparing the average front wheel speed SWf and the average rear wheel speed SWr with each other, the factor correcting means CORRECT the conversion factor R by increasing or reducing the conversion factor R to not more than the predetermined value through addition or subtraction.

The reference vehicle body speed calculating means VREFCAL calculates a reference vehicle body speed VREF from the wheel speeds $SW_1$ and $SW_2$ of the front left and right wheels FL and FR and the average rear wheel speed SWr. The antiskid control decision means ABS detects skid symptom of the front left and right wheel FL and FR and the rear left and right wheels RL and RR on the basis of the wheel speeds $SW_1$ and $SW_2$ of the front left and right wheels FL and FR, the average rear wheel speed SWr and the reference vehicle body speed VREF and outputs control signals to the signal amplifier means AMP. The signal amplifier means AMP amplifies the control signals and outputs the amplified control signals to the fluid pressure controlling means 13. As a result, the fluid pressure controlling means 13 is actuated and thus, adjusts liquid pressures of the wheel cylinders 15A, 15B, 15C and 15D of the front left and right wheels FL and FR and the rear left and right wheels RL and RR so as to perform antiskid control.

Figure 5:
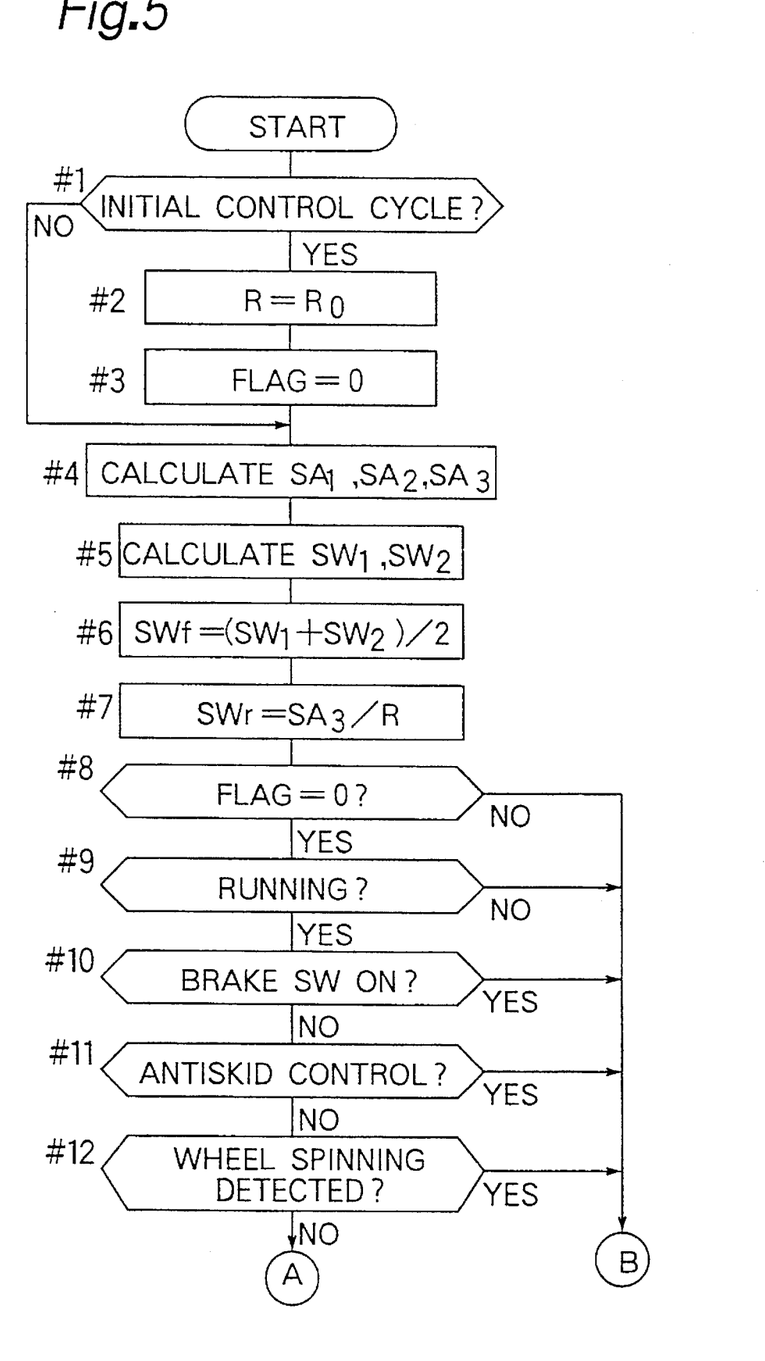
FIGS. 5 and 6 are flow charts showing operation of the wheel speed detecting apparatus of FIG. 2.
Figure 6:
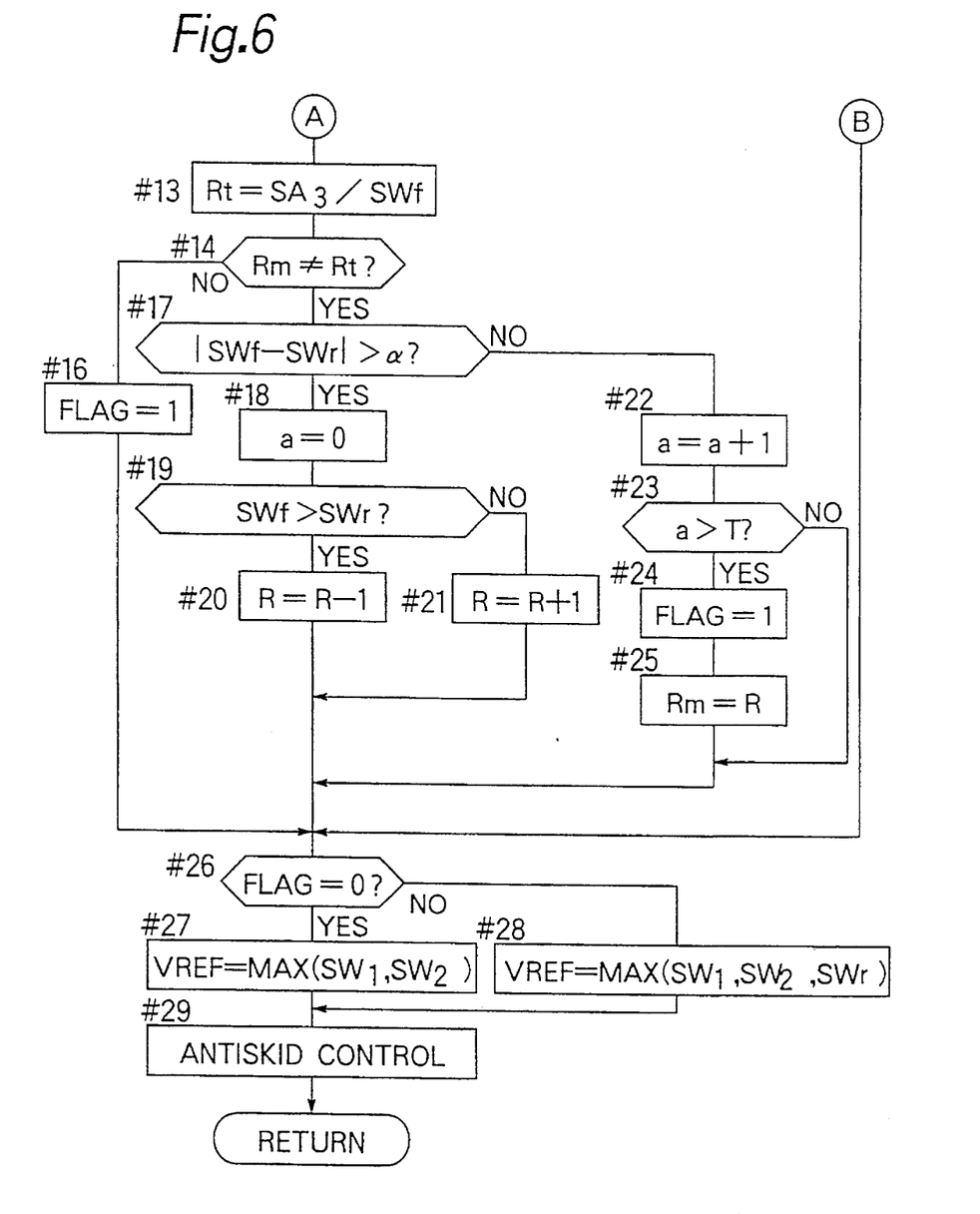

Then, operation of the wheel speed detecting apparatus 22 according to the first embodiment of the present invention is described with reference to flow charts of FIGS. 5 and 6. Processings shown in FIGS. 5 and 6 are repeated at a preset period (control cycle) until an ignition switch is turned off after turning on of the ignition switch. At steps #1 to #3, only when it is an initial control cycle after turning on of the ignition switch, the conversion factor R is set to an initial value $R_0$ and a correction completion flag FLAG is set to "0". When correction of the conversion factor R has not been completed, the correction completion flag FLAG is set to "0". On the contrary, when correction of the conversion factor R has been completed, the correction completion flag FLAG is set to "1".

At step #4, the rotational angular velocity calculating means SACAL calculates the rotational angular velocities $SA_1$, $SA_2$ and $SA_3$ of the rotary shafts 1A and 1B of the front left and right wheels FL and FR and the propeller shaft 2. Then, at step #5, the front wheel speed calculating means SWCAL calculates the wheel speeds $SW_1$ and $SW_2$ of the front left and right wheels FL and FR from the rotational angular velocities $SA_1$ and $SA_2$. Subsequently, at step #6, the average front wheel speed calculating means FAVCAL calculates the average front wheel speed SWf from the equation (3). Thereafter, at step #7, the average rear wheel speed calculating means RAVCAL calculates the average rear wheel speed SWr from the equation (7).

In FIGS. 5 and 6, processings from step #8 to step #25 are performed by the factor correcting means CORRECT. Initially, at step #8, it is judged whether or not the correction completion flag FLAG is "0". In the case of "YES" at step #8, it is judged that correction of the conversion factor R has not been completed, so that the program flow proceeds to step #9. On the contrary, in the case of "NO" at step #8, it is judged that correction of the conversion factor R has been completed, so that the program flow proceeds to step #26. At step #9, it is judged whether or not the motor vehicle is running. In the case of "YES" at step #9, the program flow proceeds to step #10. On the other hand, in the case of "NO" at step #9, the program flow proceeds to step #26 without correction of the conversion factor R. In the first embodiment, when the reference vehicle body speed VREF is not zero or is larger than a predetermined value, it is judged that the motor vehicle is running.

At step #10, it is judged whether or not the brake switch 21 in ON state. In the case of "NO" at step #10, the program flow proceeds to step #11. On the contrary, in the case of "YES" at step #10, the program flow proceeds to step #26 without correction of the conversion factor R. When the brake switch 21 is in ON state, correction of the conversion factor R is not performed for the following reason. Namely, during braking, behaviors of the wheels are not necessarily stable and thus, it is impossible to correct the conversion factor R accurately. At step #11, it is judged whether or not the motor vehicle is under antiskid control. In the case of "NO" at step #11, the program flow proceeds to step #12. On the other hand, in the case of "YES" at step #11, the program flow proceeds to step #26 without correction of the conversion factor R. When the motor vehicle is under antiskid control, correction of the conversion factor R is not performed as described above because behaviors of the wheels are not stable as at step #10. In the first embodiment, the signals outputted from the signal amplifier means AMP to the fluid pressure controlling means 13 are inspected. Thus, it is judged that the motor vehicle is under antiskid control when the signals command increase, reduction or maintenance of pressure of at least one of the wheel cylinders 15A, 15B, 15C and 15D of the wheels FL, FR, RL and RR.

At step #12, it is judged whether or not wheel spinning is detected. In the case of "NO" at step 12, the program flow proceeds to step #13. On the contrary, in the case of "YES" at step #12, the program flow proceeds to step #26 without correction of the conversion factor R. When wheel spinning is detected, the conversion factor R is not corrected as described above since behaviors of the wheels are not stable as at steps #10 and #11. In the first embodiment, the reference vehicle body speed VREF is differentiated with respect to time so as to find whether the motor body is being accelerated or decelerated and difference between a maximum and a minimum among the wheel speeds $SW_1$ and $SW_2$ of the front left and right wheels and the average rear wheel speed SWr. When not only it is found from differential of the reference vehicle body speed VREF that the motor vehicle is being accelerated but the difference between the maximum and the minimum among the wheel speeds $SW_1$ and $SW_2$ and the average rear wheel speed SWr is not less than a predetermined value, it is judged that wheels of the motor vehicle are spinning.

At step #13, a conversion factor threshold value Rt is calculated from the following equation (8).

$$Rt = SA_3/SWf \quad (8)$$

Then, at step #14, it is judged whether or not the conversion factor threshold value Rt is equal to a conversion factor value Rm stored in the first storage means $MEMO_1$. This first storage means $MEMO_1$ is formed by a nonvolatile memory in which value of the conversion factor R corrected during previous running of the motor vehicle is stored even after the ignition switch has been turned off. If it is found at step #14 that the conversion factor threshold value Rt is equal to the conversion factor value Rm, it is judged that since both change gear ratio of the differential gear and wheel radius are not changed, the conversion factor R is not required to be corrected, so that the program flow proceeds to step #16. On the other hand, if it is found at step #14 that the conversion factor threshold value Rt is not equal to the conversion factor value Rm, it is judged that it is necessary to correct the conversion factor R, so that the program flow proceeds to step #17. The correction completion flag FLAG is set to "1" at step #16 and then, the program flow proceeds to step #26.

At step #17, it is judged whether or not absolute value of difference between the average front wheel speed SWf and the average rear wheel speed SWr is larger than a predetermined value α. In the case of "YES" at step #17, since difference between the average front wheel speed SWf and the average rear wheel speed SWr is large, it is judged that the conversion factor R should be increased or reduced, so that count of a counter a is reset to "0". Then, at step #19, it is judged whether or not the average front wheel speed SWf is larger than the average rear wheel speed SWr. In the case of "YES" at step #19, it is judged that the conversion factor R is excessively large, so that "1" is subtracted from the conversion factor R at step #20. On the contrary, in the case of "NO" at step #19, the "1" is added to the conversion factor R at step #21. Meanwhile, value of subtraction and addition at steps #20 and #21 is not limited to "1" but may be set properly.

On the other hand, in the case of "NO" at step #17, it is judged that the average rear wheel speed SWr calculated by using the conversion factor R in this control cycle is accurate, the program flow proceeds to step #22 at which "1" is added to count of the counter a. Subsequently, at step #23, it is judged whether or not the count of the counter a is larger than a predetermined value T. In the case of "YES" at step #23, it is judged that the average rear wheel speed SWr has been calculated accurately for a sufficiently long period by using the conversion factor R in this control cycle, so that the correction completion flag FLAG is set to "1" at step #24. Thereafter, at step #25, the conversion factor value Rm is set to the conversion factor R of this control cycle. On the other hand, in the case of "NO" at step #23, the program flow proceeds to step #26 by skipping steps #24 and #25.

Processings from step #26 to step #28 are performed by the reference vehicle body speed calculating means VREF-CAL. Initially, at step #26, it is judged whether the correction completion flag FLAG is "0" or "1". If it is found at step #26 that the correction completion flag FLAG is "0", it is judged that correction of the conversion factor R has not been completed, so that program flow proceeds to step #27. Meanwhile, if it is found at step #26 that the correction completion flag FLAG is "1", it is judged that correction of the conversion factor R has been completed, so that the program flow proceeds to step #28. At step #27, a larger one of the wheel speeds $SW_1$ and $SW_2$ of the front left and right wheels FL and FR is set to the reference vehicle body speed VREF as per the following equation (9).

$$VREF = MAX(SW_1, SW_2) \quad (9)$$

In the equation (9), "MAX ( )" represents that a largest one of numeric values put in parentheses is selected. Meanwhile, at step #28, a largest one of the wheel speeds $SW_1$ and $SW_2$ of the front left and right wheels FL and FR and the average rear wheel speed SWr is set to the reference vehicle body speed VREF as per the following equation (10).

$$VREF = MAX(SW_1, SW_2, SWr) \quad (10)$$

Finally, at step #29, the antiskid control decision means ABS performs antiskid control in known manner on the basis of the wheel speeds $SW_1$ and $SW_2$ of the front left and right wheels FL and FR, the average rear wheel speed SWr and the reference vehicle body speed VREF. Namely, the antiskid control decision means ABS detects whether or not the front left and right wheels FL and FR and the rear left and right wheels RL and RR have skid symptom by comparing the reference vehicle body speed VREF with the wheel speed $SW_1$ and $SW_2$ of the front left and right wheels FL and FR. In case the antiskid control decision means judges that any one of the wheels FL, FR, LL and RR has skid symptom, the antiskid control decision means ABS outputs the control signals to the fluid pressure controlling means 13 through the signal amplifier means AMP so as to drive the fluid pressure controlling means 13 such that pressure of the corresponding one of the wheel cylinders 15A, 15B, 15C and 15D is reduced. Meanwhile, after skid symptom has disappeared, the fluid pressure controlling means 13 is driven so as to increase or maintain pressure of the wheel cylinders 15A and 15B.

In the wheel speed detecting apparatus according to the first embodiment of the present invention, the factor correcting means compares the average front wheel speed SWf and the average rear wheel speed SWr with each other and increases or reduces the conversion factor R through addition or subtraction until absolute value of difference between the average front wheel speed SWf and the average rear wheel speed SWr is reduced to not more than the predetermined value $\alpha$. Therefore, in the wheel speed detecting apparatus, even when setting of change gear ratio or wheel radius has been changed, the conversion factor R is corrected automatically without the need for operating a selector switch, etc. of a controller and thus, the average rear wheel speed SWr can be calculated accurately.

Meanwhile, in the first embodiment, before correction of the conversion factor R is completed, one of the wheel speeds $SW_1$ and $SW_2$ of the front left and right wheels FL and FR is set to the reference vehicle body speed VREF. On the other hand, after correction of the conversion factor R has been completed, one of the wheel speeds $SW_1$ and $SW_2$ of the front left and right wheels FL and FR and the average rear wheel speed SWr is set to the reference vehicle body speed VREF. Accordingly, even before correction of the conversion factor R is completed, antiskid control can be performed highly accurately.

Figure 7:
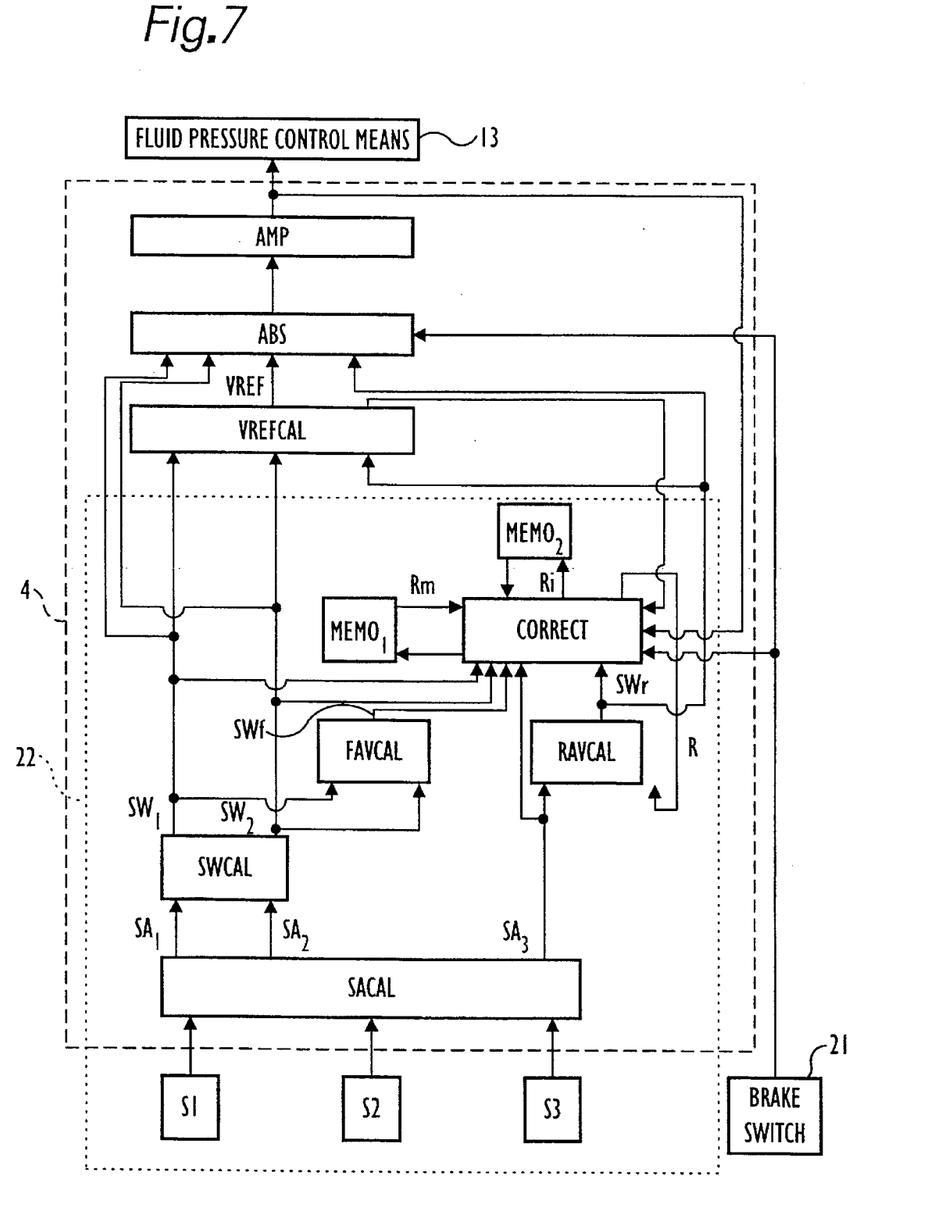
FIG. 7 is a block diagram of a wheel speed detecting apparatus according to a second embodiment of the present invention.

FIG. 7 shows a wheel speed detecting apparatus 22' according to a second embodiment of the present invention. The wheel speed detecting apparatus 22' includes a second storage means $MEMO_2$ formed by a nonvolatile memory. In the second storage means $MEMO_2$, N prospective conversion factor values $R_1, R_2, \ldots, R_N$ are stored. When one of the prospective conversion factor values $R_1-R_N$ gives a minimum of absolute values of differences between the prospective conversion factor values $R_1-R_N$ and ratio of the third rotational angular velocity $SA_3$ to the average front wheel speed and a state in which the minimum falls within a predetermined range lasts for a predetermined period, the factor correcting means CORRECT sets the one of the prospective conversion factor values $R_1-R_N$ to the conversion factor R. Meanwhile, in the second embodiment, the average rear wheel speed SWr is not inputted to the factor correcting means CORRECT. Since other constructions of the wheel speed detecting apparatus 22' are the same as those of the wheel speed detecting apparatus 22, the description is abbreviated for the sake of brevity.

Figure 8:
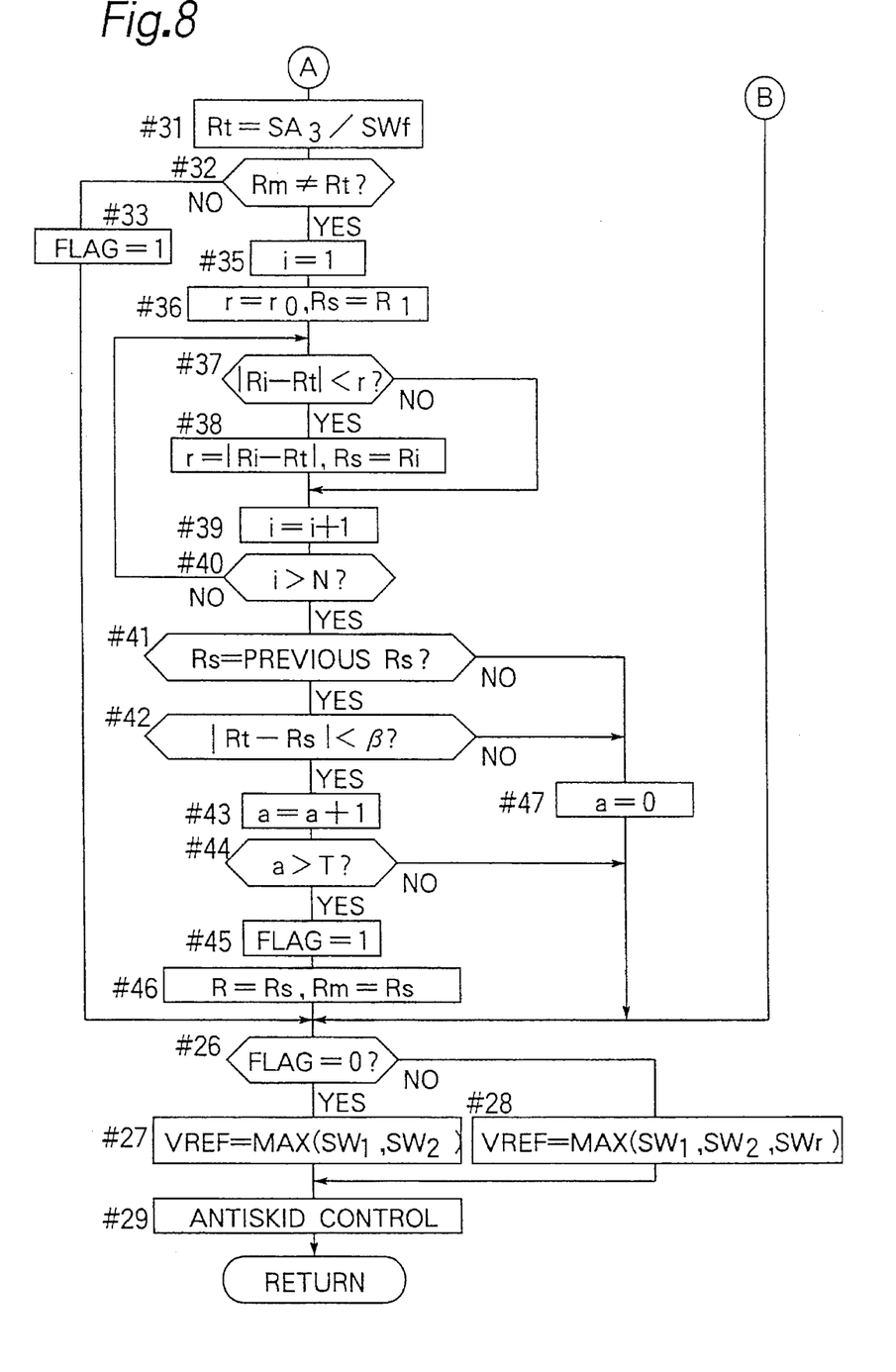
FIG. 8 is a flow chart showing operation of the wheel speed detecting apparatus of FIG. 7.

In the second embodiment, the wheel speed detecting apparatus 22' is operated in the same manner as the wheel speed detecting apparatus 22 from step #1 to step #12 of FIG. 5. However, in the second embodiment, processings from step #13 to step #36 performed by the factor correcting means CORRECT in the wheel speed detecting apparatus 22 are replaced by processings from step #31 to step #46 shown in FIG. 8. In FIG. 8, the conversion factor threshold value Rt is calculated from the equation (8) at step #31. Then, at step #32, it is judged whether or not the conversion factor threshold value Rt is equal to the conversion factor value Rm. If it is found at step #32 that the conversion factor threshold value Rt is equal to the conversion factor value Rm, the program flow proceeds to step #33 at which the correction completion flag FLAG is set to "1". From step #35 to step #40, one of the prospective conversion factor values $R_1-R_N$, which gives minimum of absolute value of difference between each of the prospective conversion factor values $R_1-R_N$ and ratio of the rotational angular velocity $SA_3$ of the propeller shaft 2 to the average front wheel speed SWf, is selected as described above. Initially, at step #36, a factor difference r indicative of absolute value of difference between the prospective conversion factor value $R_i$ and the conversion factor threshold value Rt is set to an initial value $r_0$. Meanwhile, at step #36, an initial value of an optimum prospective conversion factor value Rs is set to the prospective conversion factor value $R_1$.

Then, at step #37, it is judged whether or not absolute value of difference between the prospective conversion factor value $R_i$ and the conversion factor threshold value Rt is less than the factor difference r. In the case of "YES" at step #37, the program flow proceeds to step #38. On the contrary, in the case of "NO" at step #37, the program flow proceeds to step #39. At step #38, the factor difference r is set to the absolute value of difference between the prospective conversion factor value $R_i$ and the conversion factor threshold value Rt, which was calculated at step #37. In addition, at step #38, the optimum prospective conversion factor value Rs is set to the prospective conversion factor value $R_i$. When processings from step #37 to step #40 have been repeated N times for all the prospective conversion factor values $R_1-R_N$, the prospective conversion factor value $R_i$, which minimizes absolute value of difference between the prospective conversion factor value $R_i$ and the conversion factor threshold value Rt, is set to the optimum prospective conversion factor value Rs.

Subsequently, at step #41, it is judged whether or not the optimum prospective conversion factor value Rs calculated in this control cycle is equal to that calculated in the previous control cycle. In the case of "YES" at step #41, it is judged that since the same prospective conversion factor value $R_i$ is set to the optimum prospective conversion factor value Rs successively in this and previous control cycles, there is a high possibility that the optimum prospective conversion factor value Rs can be set to the conversion factor R, so that the program flow proceeds to step #42. On the other hand, in the case of "NO" at step #41, the program flow proceeds to step #47. At step #42, it is judged whether or not absolute value of difference between the conversion factor threshold value Rt and the optimum prospective conversion factor value Rs is less than a predetermined value $\beta$. In the case of "NO" at step #42, the program flow proceeds to step #47. On the contrary, in the case of "YES" at step #42, the program flow proceeds to step #43.

At step #43, "1" is added to count of the counter a. Then, at step #44, it is judged whether or not the count of the counter a is larger than the predetermined value T. In the case of "YES" at step #44, it is judged that the same prospective conversion factor value $R_i$ is set to the optimum prospective conversion factor value Rs for a sufficiently long period, so that the program flow proceeds to step #45. At step #45, the correction completion flag FLAG is set to "1". Thereafter, at step #46, the conversion factor R and the conversion factor value Rm are set to the optimum prospective conversion factor value Rs. Then, at step #47, count of the counter a is reset to "0". Processings from step #26 to step #29 in FIG. 8 are the same as those of FIG. 6.

In the second embodiment, when one of a plurality of the prospective conversion factor values $R_1$-$R_N$ gives a minimum of absolute values of differences between the prospective conversion factor values $R_1$-$R_N$ and ratio of the rotational angular velocity $SA_3$ of the propeller shaft 2 to the average front wheel speed SWf and a state in which the minimum falls within the predetermined range lasts for a predetermined period, the factor correcting means CORRECT sets the one of the prospective conversion factor values $R_1$-$R_N$ to the conversion factor R as described above. Accordingly, in the same manner as the first embodiment, in case setting of change gear ratio or wheel radius has been changed, the conversion factor R is automatically corrected without the need for operating a selector switch, etc. of a controller and thus, the average rear wheel speed SWr can be calculated accurately.

Figure 9:
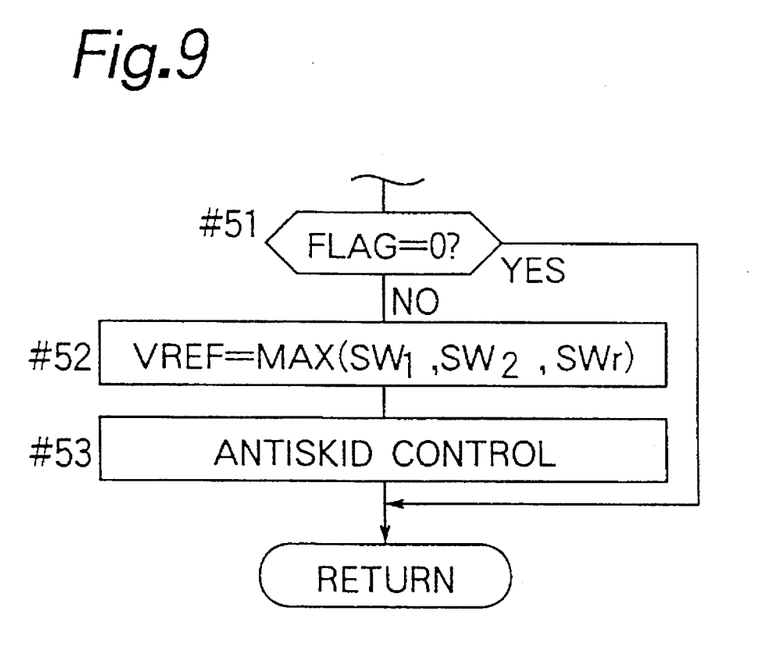
FIG. 9 is a flow chart indicative a modification of the wheel speed detecting apparatuses of FIGS. 2 and 7.

Meanwhile, the present invention is not limited to the above described embodiments but can be modified variously. For example, as will be seen from steps #26–#29 of FIGS. 6 and 8, before correction of the conversion factor R is completed, a larger one of the wheel speeds $SW_1$ and $SW_2$ of the front left and right wheels FL and FR is set to the reference vehicle body speed VREF. Meanwhile, after correction of the conversion factor R has been completed, a largest one of the wheel speed $SW_1$ and $SW_2$ of the front left and right wheels FL and FR and the average rear wheel speed SWr is set to the reference vehicle body speed VREF. However, steps #26–#29 may also be replaced by steps #51–#53 shown in FIG. 9. At step #51, it is judged whether the correction completion flag FLAG is equal to "0" or "1". When the correction completion flag FLAG is "0", namely, correction of the conversion factor R has not been completed, antiskid control is not performed. On the other hand, when the correction completion flag FLAG is "1", namely correction of the conversion factor R has been completed, a largest one of the wheel speeds $SW_1$ and $SW_2$ of the front left and right wheels FL and FR and the average rear wheel speed SWr is set to the reference vehicle body speed VREF at step #52 and then, antiskid control is performed at step #53. Furthermore, in FIG. 9, since antiskid control is not performed before correction of the conversion factor R is completed, such a risk that antiskid control is not performed accurately can be prevented.

In addition, construction of the wheel speed sensor is not restricted to that shown in FIG. 3 but may be changed such that, for example, N-poles and S-poles are alternately magnetized at an outer periphery of the rotor.

As is clear from the foregoing description of the wheel speed detecting apparatus of the present invention, average rear wheel speed of the rear left and right wheels is calculated from the rotational angular velocity $SA_3$ of the propeller shaft and the conversion factor including the change gear ratio of the transmission mechanism and the wheel radius and the conversion factor is corrected either by a method in which the conversion factor is increased or reduced through addition or subtraction until absolute value of difference between the average front wheel speed and the average rear wheel speed reaches the predetermined value or less or by another method in which when one of a plurality of the prospective conversion factor values gives a minimum of absolute values of differences between the prospective conversion factor values and ratio of the rotational angular velocity of the propeller shaft to the average front wheel speed and a state that the minimum falls within a predetermined range lasts for a predetermined period, the one of the prospective conversion factor values is set to the conversion factor. Accordingly, even when setting of change gear ratio or wheel radius has been changed, the conversion factor is automatically set properly and thus, the average rear wheel speed can be calculated accurately.

Meanwhile, in the wheel speed detecting apparatus of the present invention, since the conversion factor is automatically set properly, production cost of the controller can be reduced by eliminating the need for providing on the controller a selector switch for setting the conversion factor. Furthermore, it is possible to prevent drop of detection accuracy of wheel speed due to malfunctions of the selector switch, operator's inadvertent failure to operate the selector switch, etc.

Meanwhile, in the wheel speed detecting apparatus of the present invention, in case correction of the conversion factor is not performed during antiskid control, during detection of wheel spinning or during braking, such a risk is eliminated that inaccurate wheel speed is detected by correcting the conversion factor in unstable behaviors of the wheels and thus, high detection accuracy of wheel speed can be maintained positively.

What is claimed is:

1. A wheel speed detecting apparatus for detecting wheel speed of a motor vehicle in which a drive shaft coupled with a driving source is connected with rotary shafts of rear left and right wheels through a transmission mechanism, the wheel speed detecting apparatus comprising:

first, second and third means for outputting pulse signals in response to rotations of rotary shafts of front left and right wheels and the drive shaft, respectively;

a rotational angular velocity calculating means for calculating first, second and third rotational angular velocities of the rotary shafts and the front left and right wheels and the drive shaft from the pulse signals of the first, second and third sensor means, respectively;

a front wheel speed calculating means for calculating first and second wheel speeds of the front left and right wheels from the first and second rotational angular velocities, respectively;

an average front wheel speed calculating means for calculating an average front wheel speed of the front left and right wheel speeds;

an average rear wheel speed calculating means for calculating an average rear wheel speed of the rear left and right wheels from the third rotational angular velocity and a conversion factor based upon a change gear ratio of the transmission mechanism and a wheel radius; and a conversion factor correcting means for correcting the conversion factor based upon the calculated average front wheel speed and the calculated average rear wheel speed.

2. A wheel speed detecting apparatus as claimed in claim 1, wherein the conversion factor correcting means compares the average front wheel speed and the average rear wheel speed with each other and increases or reduces the conversion factor through addition or subtraction until an absolute value of a difference between the average front wheel speed and the average rear wheel speed reaches not more than a predetermined value.

3. A wheel speed detecting apparatus as claimed in claim 1, further comprising a plurality of prospective conversion factor values, wherein, when one of said plurality of prospective conversion factor values yields a minimum absolute values of differences between said one prospective conversion factor value and a ratio of the third rotational angular velocity to the average front wheel speed, and the minimum falls within a predetermined range for a predetermined period of time, the conversion factor correcting means sets said one of the prospective conversion factor values as the conversion factor.

4. A wheel speed detecting apparatus as claimed in claim 1, wherein the conversion factor is not corrected during antiskid control of the motor vehicle.

5. A wheel speed detecting apparatus as claimed in claim 1, wherein the conversion factor is not corrected during detection of spinning of the wheels.

6. A wheel speed detecting apparatus as claimed in claim 1, wherein the conversion factor is not corrected during braking of the motor vehicle.

7. A wheel speed detecting apparatus for detecting wheel speed of a motor vehicle in which a drive shaft coupled with a driving source is connected with rotary shafts of driven left and right wheels through a transmission mechanism, the wheel speed detecting apparatus comprising:

first, second and third sensors for outputting pulse signals in response to rotation of non-driven rotary shafts of the non-driven left and right wheels and the drive shaft, respectively;

angular velocity calculating means for calculating first, second and third angular velocities of the non-driven rotary shafts and the drive shaft from said pulse signals of said first, second and third sensors, respectively;

wheel speed calculating means for calculating respective wheel speeds of the non-driven left and right wheel from said calculated first and second angular velocities, respectively;

average non-driven wheel speed calculating means for calculating an average wheel speed of the non-driven left and right wheels from said calculated first and second angular velocities;

average driven wheel speed calculating means for calculating an average driven wheel speed of the driven left and right wheels from said calculated third angular velocity and a conversion factor based upon a change gear ratio of the transmission mechanism and a wheel radius; and conversion factor correcting means for correcting said conversion factor based upon said calculated average non-driven wheel speed and said calculated average driven wheel speed.

8. The wheel speed detecting apparatus as claimed in claim 7, wherein said conversion factor correcting means compares said calculated average non-driven wheel speed to said calculated average driven wheel speed and adjusts said conversion factor through one of addition and subtraction until an absolute value of a difference between said calculated average non-driven wheel speed and said calculated average driven wheel speed is less than a predetermined value.

9. The wheel speed detecting apparatus as claimed in claim 7, wherein, when one of a plurality of prospective conversion factor values yields a minimum absolute value of a difference between said one prospective conversion factor value and a ratio of said calculated third angular velocity to said average non-driven wheel speed, and the minimum falls within a predetermined range for a predetermined period of time, said conversion factor correcting means sets said one of said prospective conversion factor values as said conversion factor.

10. The wheel speed detecting apparatus as claimed in claim 7, further comprising means for bypassing said conversion factor correcting means during antiskid control of the motor vehicle.

11. The wheel speed detecting apparatus as claimed in claim 7, further comprising means for bypassing said conversion factor correcting means during detection of spinning of the wheels.

12. The wheel speed detecting apparatus as claimed in claim 7, further comprising means for bypassing said conversion factor correcting means during braking of the motor vehicle.

* * * * *

UNITED STATES PATENT AND TRADEMARK OFFICE
CERTIFICATE OF CORRECTION

PATENT NO.   : 5,563,793
DATED        : October 8, 1996
INVENTOR(S)  : Tohru NAKAURA It is certified that error appears in the above-indentified patent and that said Letters Patent is hereby corrected as shown below:

On the cover, in section [75], "Inventor:", line 1, change "Itami" to ---Hyogo---.

Signed and Sealed this

Eighth Day of April, 1997

Attest:

BRUCE LEHMAN

Attesting Officer

Commissioner of Patents and Trademarks